United States Patent
Rajpal et al.

(10) Patent No.: US 12,164,388 B2
(45) Date of Patent: Dec. 10, 2024

(54) CONFIGURATION RECOVERY FOR A DATA MANAGEMENT SYSTEM

(71) Applicant: Rubrik, Inc., Palo Alto, CA (US)

(72) Inventors: Shivam Rajpal, Saharanpur (IN);
Mudit Malpani, Sunnyvale, CA (US);
Arvind Batra, Bengaluru (IN);
Sriharshitha Velivelli, Hyderabad (IN);
Arnav Rupde, Bengaluru (IN); Chak Fai Yuen, Bengaluru (IN)

(73) Assignee: Rubrik, Inc., Palo Alto, CA (US)

( * ) Notice: Subject to any disclaimer, the term of this patent is extended or adjusted under 35 U.S.C. 154(b) by 113 days.

(21) Appl. No.: 17/940,998

(22) Filed: Sep. 8, 2022

(65) Prior Publication Data

US 2024/0086285 A1  Mar. 14, 2024

(51) Int. Cl.
*G06F 11/00* (2006.01)
*G06F 11/14* (2006.01)

(52) U.S. Cl.
CPC ...... *G06F 11/1464* (2013.01); *G06F 11/1461* (2013.01); *G06F 11/1469* (2013.01); *G06F 2201/84* (2013.01)

(58) Field of Classification Search
CPC ............ G06F 11/1464; G06F 11/1461; G06F 11/1469
See application file for complete search history.

(56) References Cited

U.S. PATENT DOCUMENTS

| | | | | |
|---|---|---|---|---|
| 8,713,271 B2* | 4/2014 | Sundrani | ............. | G06F 11/2074 |
| | | | | 711/E12.103 |
| 9,904,610 B2* | 2/2018 | Bennah | ............... | G06F 11/2028 |
| 10,664,357 B1* | 5/2020 | Mallik | ................ | G06F 11/1464 |
| 2008/0226082 A1* | 9/2008 | Brunet | .................. | H04L 9/0897 |
| | | | | 713/193 |
| 2016/0110267 A1* | 4/2016 | Earl | ..................... | G06F 9/45533 |
| | | | | 714/19 |

* cited by examiner

*Primary Examiner* — Amine Riad
(74) *Attorney, Agent, or Firm* — Holland & Hart LLP

(57) ABSTRACT

A data management system may support a configuration backup of a first backup system that manages backup procedures for data of a host environment that is separate from the first backup system. The data management system may transmit, to the first backup system, a request to generate the configuration backup that includes information for the one or more backup procedures managed by the first backup system. The data management system may cause the configuration backup to be stored in a separate storage location. In response to first backup system failure, the data management system may transmit, to a second backup system, a request to apply one or more configurations for the first backup system to the second backup system based on the stored configuration backup for the first backup system.

20 Claims, 11 Drawing Sheets

CONFIGURATION RECOVERY FOR A DATA MANAGEMENT SYSTEM

FIELD OF TECHNOLOGY

The present disclosure relates generally to database systems and data processing, and more specifically to configuration recovery for a data management system.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

A backup system may be configured to protect customer workloads in case of production environment failure. For example, the backup system may receive and manage snapshots of the production environments, such as virtual machines that support execution of services (e.g., a web server, application server, or database server). The snapshot may capture a state of the virtual machine environment. The backup system may manage scheduling, storage, and retention of snapshots. Additionally, when a production environment experiences a failure or outage, the backup system may support recovery of an environment based on one or more of the managed snapshots. In cases where the backup system itself experiences an outage, the customer configurations (e.g., backup configurations) may be lost, and it can involve weeks to acquire and configure a new backup device. As customers are implementing more and more virtual environments to support services, reconfiguring backup systems is increasingly complex. Further, during the downtime of the backup system, the data (e.g., production data) is vulnerable as protections provided by the backup system (e.g., backup services) may not be available.

Techniques described herein support backing up the configurations of a backup system and storing the configuration backup in a secure location separate from the backup system. The configuration backup may be stored in a second backup system or in secure cloud storage. If the backup system fails, then the associated configurations may be restored on a new, replacement backup system using the configuration backup. Additional techniques are also described whereby a user may configure various parameters associated with generating, maintaining, and recovering from the configuration backups, such as configuration backup schedules and retention periods, configuration backup storage locations, the use of related encryption keys (to support the configuration backups being securely stored), and how to handle various customer security parameters (e.g., usernames/passwords) that may be included in the configurations being backed up. Additionally, when configurations are restored to a new backup system based on a configuration backup for a prior backup system, the user may select which portions (e.g., some or all) of the configurations to restore. These and other techniques are described in further detail with respect to the figures.

Aspects of the disclosure are initially described in the context of a computing environment supporting data management. Aspects of the disclosure are further described with respect to a computing environment supporting data backup, data recovery, and configuration backup, a block diagram illustrating configuration backup, and a process flow. Aspects of the disclosure are further illustrated by and described with reference to apparatus diagrams, system diagrams, and flowcharts that relate to configuration recovery for a data management system.

Figure 1:
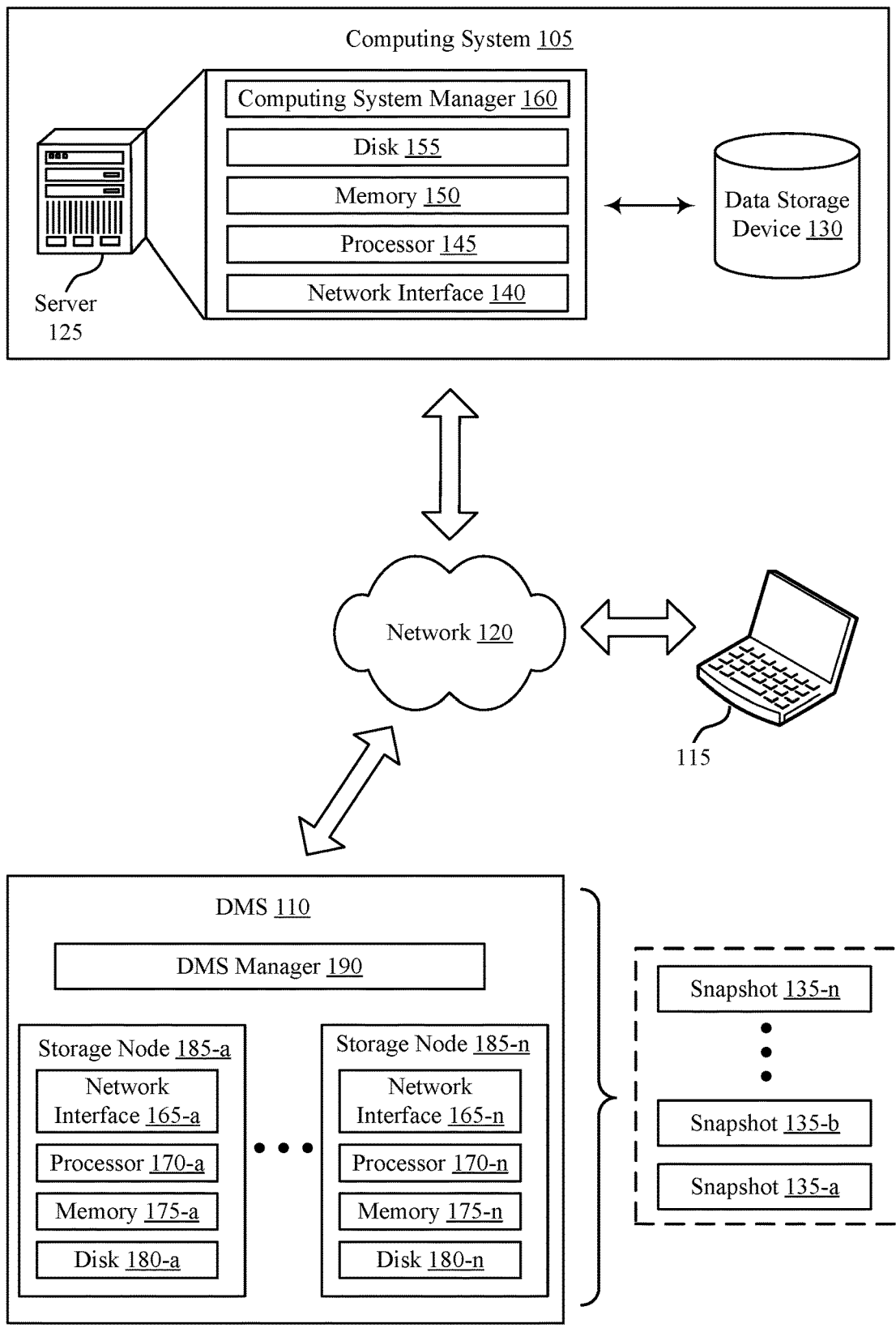
FIG. 1 illustrates an example of a data management system that supports configuration recovery for a data management system in accordance with aspects of the present disclosure.

FIG. 1 illustrates an example of a computing environment 100 that supports configuration recovery for a data management system in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

As described herein, the DMS 110 may support data backup, management, and recovery services for the computing system 105, which may be referred to as a host environment herein. The DMS 110 may perform backup, management, and recovery services according to various backup configuration parameters, which may be referred to as workload settings. If the DMS 110 were to experience an outage, the backup configuration parameters may be lost. Acquisition and configuration of new backup devices (e.g., a new DMS 110) may take weeks and may be complex. As the amount of virtual machine environments and other types of computing environments continues to increase, reconfiguring backup systems, such as a new DMS 110) is increasingly complex. Additionally, while the DMS 110 is down (e.g., during an outage), data of the server 125 may be vulnerable, as protections provided by the DMS 110 may not be available.

Techniques described herein support a backup of the configuration parameters of the DMS 110. For example, a user may access a cloud platform to configure various parameters for the backup of the host environment (e.g., the computing system 105) by the DMS 110 as well as to configure the backup configuration for the configuration backup of the DMS 110. The user may configure parameters such as a backup schedule or a backup retention period for the configuration backup. The cloud platform may transmit, to the DMS 110 (e.g., a backup system), a request to generate a configuration backup for the DMS 110. In some cases, the cloud platform may be another DMS 110 (e.g., a second DMS 110).

The DMS 110 may generate the configuration backup (e.g., a snapshot) that includes the configuration information (e.g., the configuration parameters) for the backup procedures managed by the DMS 110. The configuration backup may be stored in another location, separate from the DMS 110. For example, the configuration backup may be stored at another DMS 110 (e.g., a third DMS 110) or in a cloud storage environment (e.g., the cloud platform or in a cloud services provider cloud storage system).

If the DMS 110 experiences an outage, then cloud platform may cause the configuration backup to be restored to a second backup system. For example, the cloud platform may transmit, to the second backup system, the request to apply the configurations of the DMS 110 to the second backup system based on the configuration backup that was previously stored in a separate location, apart from the DMS 110. In some cases, the second backup system may be another DMS 110 (e.g., a fourth DMS 110).

Thus, the techniques described herein provide backup and recovery procedures for a backup system (e.g., the DMS 110), which may support increased data security for a host environment (e.g., computing system 105). More particularly, as the configuration backup may be used to efficiently recover backup configurations, the protections provided by the DMS 110 may not be down for extended periods, thus improving data security for the server 125. Additionally, techniques described herein may support configuration backup and recovery using various user provided configurations that are applied to generate and recover the configuration backup, encryption of the configuration backup, and partial recovery for security configurations One or more aspects of the disclosure may be implemented in a computing environment 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
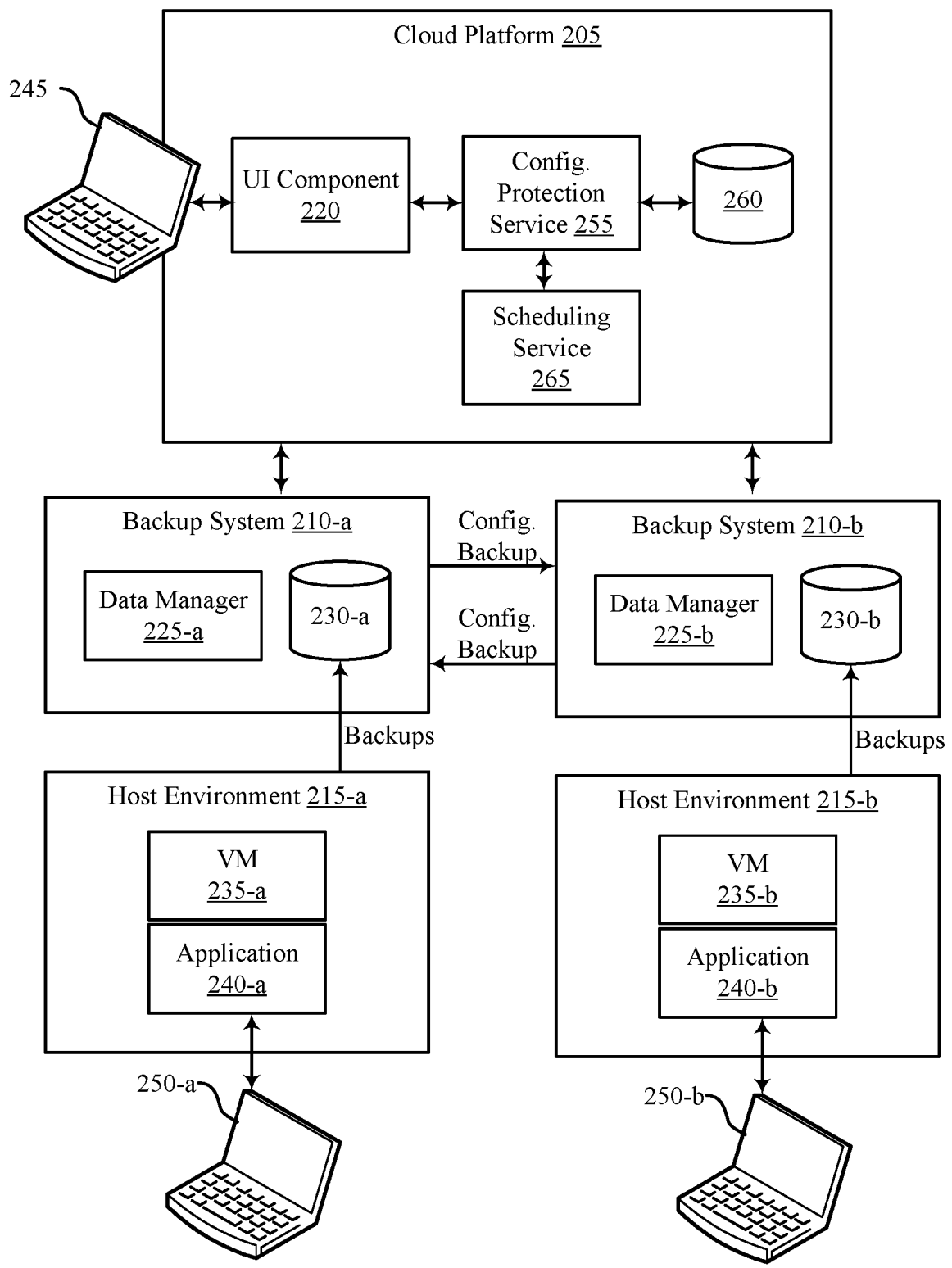
FIG. 2 illustrates an example of a computing environment that supports configuration recovery for a data management system in accordance with aspects of the present disclosure.

FIG. 2 illustrates an example of a computing environment 200 that supports configuration recovery for a data management system in accordance with aspects of the present disclosure. The computing environment 200 may implement or may be implemented by aspects of computing environment 100 of FIG. 1. The computing environment 200 includes a cloud platform 205, backup systems 210, and host environments 215. The cloud platform 205 may be an example of a DMS 110 as described with respect to FIG. 1, or an associated system. The backup systems 210 may be examples of the DMS 110 as described with respect to FIG. 1, and the host environments 215 may be examples of the computing system 105 as described with respect to FIG. 1. The host environments 215 may execute virtual machines 235 that support various applications 240 that may be accessible by clients, such as client devices 250.

The backup systems 210 may manage backup and recovery services for the respective host environment 215. For example, the backup system 210-*a* may receive periodic snapshots of the host environment 215-*a*, and the periodic snapshots may be activated and received according to a backup schedule and stored in a snapshot datastore 230-*a*. The backup system 210-*a* may also maintain the snapshots of the host environment 215-*a* according to a retention period. The backup system 210 may mange consolidation and deletion of various snapshots corresponding to the host environment 215. A backup system (e.g., the backup system 210-*a*) may manage and support any quantity of host environments (e.g., the host environment 215-*a*), and a backup system may be geographically co-located or remote from the host environment. In some examples, the backup system 210 may perform backup, retention, and recovery according to various configurations that may be defined by configuration parameters. The configurations may define backup periodicity or schedule, backup retention periods, recovery procedures, security parameters, etc.

The cloud platform 205 may be used to access, manage, and monitor the functionality of the various backup systems 210. For example, the cloud platform may support a UI component 220 that a user may access via a user device 245 to access and manage the functionality of the backup systems 210. In some cases, the user may configure or modify a backup periodicity or snapshot retention period for the backup systems 210 or the host environments 215 associated with the backup systems.

In cases where a host environment 215 experiences an outage, the UI component 220 may be used to activate restoration of the host environment 215 to another system (e.g., another host environment) based on a snapshot stored by the backup system 210. Thus, the backup systems 210 provide data protections, security, and restoration services (e.g., backup procedures). In some cases, one of the backup systems 210 may experience an outage, which may result in the data of a corresponding host environments 215 being vulnerable, as the protections provided by the backup system 210 may be unavailable. Additionally, an outage to a backup of system may result in the loss of the configurations that support the backup procedures managed by the backup system 210. Acquiring and configuring a new backup system 210 after an outage may involve a significant amount of time (e.g., weeks) and may require significant administrative overhead. As computing environments are increasingly complex (e.g., multiple virtual machines 235 for a host environment and/or multiple host environments managed by a backup system), reconfiguring workloads is increasingly difficult and resource intensive.

Techniques described herein support generation of a configuration backup of the backup systems 210, which may support reduced downtown of the backup systems as well as reduced administrative overhead in configuring a new backup system upon backup system failure. Thus, in addition to the backup systems 210 supporting backup of the host environments 215, a backup of the backup systems 210 may also be generated. A configuration backup (e.g., a backup of the backup system 210) may include configuration information for the one or more backup procedures (e.g., backup workloads) managed by the backup system 210. The configuration information may include, without limitation, backup schedule, retention period, security information, client or user credentials, V-Center credentials, usernames/passwords, target objects for backup, and workload type (e.g., V-Center backup)

In some examples, the cloud platform 205 may manage configuration backups of the backup systems 210. For example, according to a configured configuration backup schedule (e.g., configured by a user of the user device 245 that accesses the UI component 220) or based on an on-demand implementation, the cloud platform 205 may request that the first backup system 210-*a* generate a configuration backup that includes the configuration information for the backup procedures managed by the backup system 210-*a*. The configuration backup for the backup system 210-*a* may be stored in a location separate from the backup system 210-*a* in order to support additional security in case of failure of the backup system 210. In some examples, the configuration backup of the backup system 210-*a* may be stored in a separate backup system, such as backup system 210-*b* (e.g., replication target). For example, if both the backup system 210-*a* and the backup system 210-*b* are associated with the same organization, one of the backup systems 210 may store the configuration backup for the other backup system 210. Additionally, or alternatively, the configuration backup may be stored in a cloud storage environment, such as a cloud environment associated with the cloud platform 205 or associated with an organization corresponding to the host environment 215-*a*. The location may be based on a user provided configuration.

The configuration backup of the backup system 210 may be encrypted in the storage location. For example, if stored in the backup system 210-*b*, the configuration backup may be stored in the secure file system of the backup system 210. Similarly, if the configuration backup is stored in the cloud storage environment, the configuration backup may be encrypted at the cloud storage environment (e.g., a cloud storage bucket). The encryption key and/or the type of encryption may be configured by the user at the cloud platform 205.

As described herein, the UI component 220 supports selection and configuration of various parameters for services provided by the backup systems 210 as well as for configuration backups for the backup systems 210. For example, the user may select, via the UI component 220, the backup systems 210 (e.g., clusters) that the user wants protected. The user may enter backup frequency and retention period as well as an encryption password or key at the UI component 220. The user may also enter or select the backup storage location (e.g., the other backup system 210, a cloud storage environment, or an object store). A configuration protection service 255 of the cloud platform may persist parameters corresponding to the configurations and information entered by the user into a storage location 260 (e.g., a cloud SQL service). A scheduling service 265 may schedule the backup job(s) for the backup systems 210. When the backup job is initiated, the cloud platform 205 may call (e.g., transmit a request to) an API endpoint corresponding to the backup system 210 that is to be backed up. The backup system 210 may perform backup in response to receiving the API request from cloud platform 205 and store the resulting configuration backup in the identified location. In some examples, the location may be indicated in the request transmitted by the cloud platform 205. As such, the cloud platform 205 may cause the configuration backup to be stored in one or more different storage locations.

The scheduling service 265 may perform, in addition to scheduling configuration backups, services related to configuration backup deletion (e.g., based on a user entered retention period). The cloud platform 205 may also perform data management techniques, such as logging performed configuration backups with timestamps and a storage location identifier, such as to support providing a view of the configuration backups to the user. The cloud platform 205 may also maintain API endpoints for backups, restore, scheduling management, retention management, and the like. For example, in response to a backup system failure of backup system 210-*a*, the cloud platform 205 may call an API corresponding to a target backup system to which the backup system 210-*a* (or the configurations for one or more backup jobs managed by the backup system 210-*a*) is to be restored. The API request (e.g., restore request) may indicate a location where the configuration backup to be restored is located.

The cloud platform 205 may also support a service that allows a user to select the configurations of the backup that are to be restored. For example, a user may select the objects or workload configurations (e.g., a subset of V-Centers, a set of SQL hosts) of the configuration backup that are to be restored. To support such a selection, the configuration backup may be loaded to the target location (e.g., the new backup system 210), and then the user may select the portion of the configuration backup to restore (e.g., via UI component 220). As such, the configuration information of the backup may be displayed to the user for selection at the UI component 220. Selectable or un-selectable configuration for restore may also include user or customer information such as username and password information. In such cases, the user may determine to not restore the passwords for a set of usernames for security reasons. As such, the restore procedure may restore the usernames with default passwords. In some cases, a user may select, before scheduling configuration backups, to avoid backing up the username and/or password information.

In another example, a configuration backup corresponding to backup system 210-*a* is generated. After the configuration backup is generated, a password for a V-Center of the backup system 210-*a* is changed. After failure of the backup system 210-*a*, the configuration backup is used to restore the configurations at a new backup system. However, the backed-up password may not be used to connect to the V-center instance. As such, during the restore procedure, a user may select to override the backed-up password (e.g., by entering the updated password) for the restore.

Figure 3:
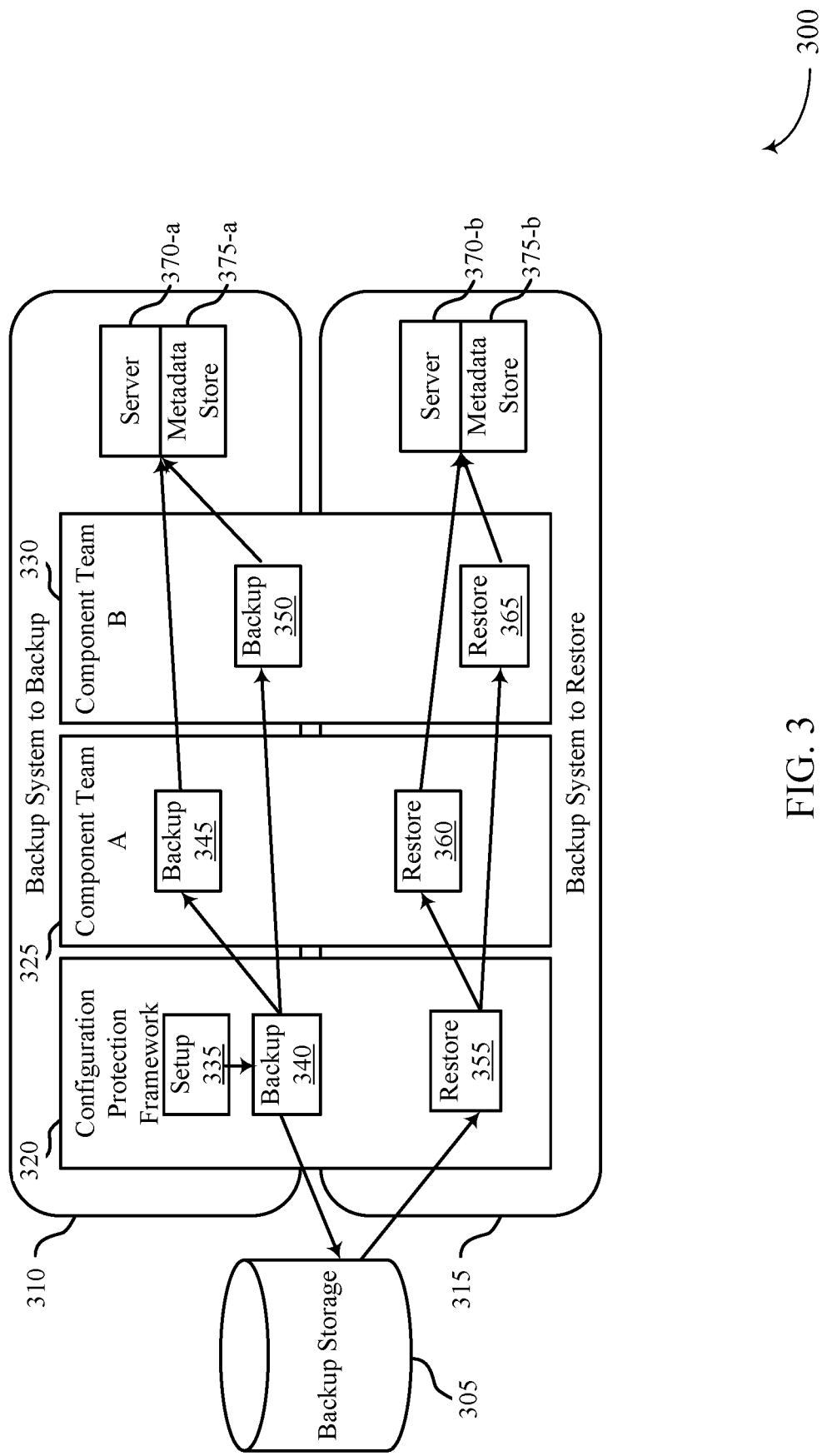
FIG. 3 illustrates an example of a diagram of a framework that supports configuration recovery for a data management system in accordance with aspects of the present disclosure.

FIG. 3 illustrates an example diagram of a framework 300 that supports configuration recovery for a data management system in accordance with aspects of the present disclosure. The framework 300 includes a backup storage system 305, a backup system 310, and a backup system 315. The backup system 310 and the backup system 315 may be examples of the backup systems 210 as described with respect to FIG. 2 and/or the DMS 110, as described with respect to FIG. 1. The backup storage system 305 may be an example of the separate storage location as described herein, such as another backup system, a cloud storage environment, a cloud bucket, or the like.

A configuration protection framework 320, a component team A 325, and a component team B 330 represent various code blocks, procedures, or the like that support configuration backup and recovery. For example, the configuration protection framework 320 may be implemented by both the backup system 310 and the backup system 315, and the configuration protection framework 320 may represent example code that may be executed after receipt of a request from a cloud platform (e.g., a cloud platform 205 of FIG. 2) and/or another DMS 110. The component team A 325 and the component team B 330 may represent code for backing up and restoring a particular job or workload that is managed by the backup system 310. For example, the backup system 310 may perform a backup workload A that backs up data of a host environment (e.g., a first V-center) that is separate from the backup system 310 according to various configuration parameters, as described herein (e.g., backup schedule, retention period, credentials). The backup system 310, as part of component team A 325, may maintain a backup procedure 340 that is used to back up the backup workload A. The backup procedure 345 may call aspects of the server 370-a and access the metadata store 375-a in order to gather and identify information that is to be backed up for the backup workload A. Similarly, the component team B 330 may represent code for backup/recovery of a backup workload B that is managed by the backup system 310. The workload B may be a separate backup workload for the same host environment as the backup workload A or for a different host environment from the host environment backed-up by workload A. For example, the workload B may perform backup procedures for a second V-center on the same host environment as the V-Center backed-up by workload A. A backup procedure 350 may be used to back up the backup workload B by calling the server 370-a and the metadata store 375-a to gather the requisite information.

When the cloud platform is backing up one or more of the workloads of the backup system 310, the cloud platform may transmit it request that results in execution of backup procedure 340, which may, in turn, cause execution of the backup procedure 345 and the backup procedure 350. The resulting configuration backup may be stored in the backup storage system 305, as described herein. In some examples, a setup procedure 335 may be used to configure the backup procedure 340, by indicating the backup procedures 345 and 350, the storage location, and other parameters as described herein. Thus, by using these techniques the configuration for the configuration backup may be abstracted away from the procedures being implemented, which may support improved user experience, as well as improved backup efficiency.

The configuration protection framework 320 also includes a restore procedure 355, which depends on or uses a restore procedure 360 of component team A 325 and a restore procedure 365 for component team B 330. After receiving a restore request at the backup system 315, the restore procedure 355 may download the corresponding configuration backup from the backup storage system 305. Additionally, the restore procedure 360 may be executed to restore the backup workload A at the backup system 315, and the restore procedure 365 may be executed to restore workload B at the backup system 315. The restore procedures 360 and the restore procedure 365 may load corresponding metadata into the metadata store 375 and execute or load corresponding API calls at the server 370-b. Thus, configuration protection framework 320 may abstract the restore procedures for restoring various workloads, resulting in improved user experience and improved restore efficiencies.

Figure 4:
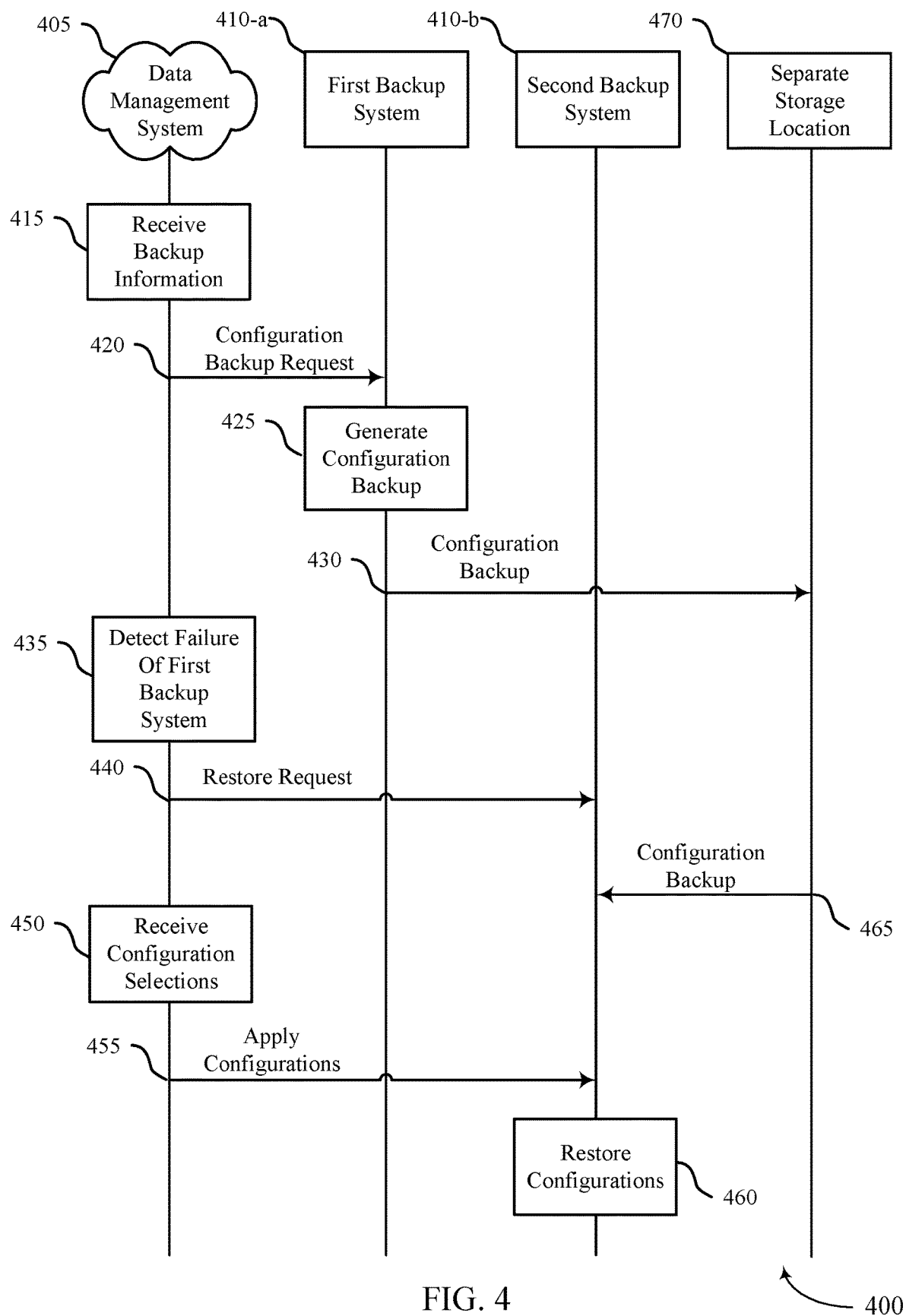
FIG. 4 illustrates an example of a process flow that supports configuration recovery for a data management system in accordance with aspects of the present disclosure.

FIG. 4 illustrates an example of a process flow 400 that supports configuration recovery for a data management system in accordance with aspects of the present disclosure. The process flow 400 includes a data management system 405, a first backup system 410-a, a second backup system 410-b, and a separate storage location 470, which may be examples of the corresponding devices or systems as described with respect to FIGS. 1 through 3. For example, the data management system 405 may be an example of a cloud platform or other type of DMS as described herein, and the separate storage location 470 may be an example of a DMS, a backup system, or a cloud storage environment. In the following description of the process flow 400, the signaling may be transmitted in a different order than the example order shown, or the operations performed may be performed in different orders or at different times. Some operations may also be omitted from the process flow 400, and other operations may be added to the process flow 400.

At 415, the data management system 405 may receive configuration backup information. For example, the data management system 405 may receive, via a user interface, an indication of a backup schedule, a backup retention period, or both for a configuration backup for data of a host environment. Additionally, or alternatively, the data management system 405 may receive, via a user interface of the data management system, an indication of an encryption key to use for encrypting the configuration backup.

At 420, the data management system 405 may transmit, to the first backup system 410-a that manages one or more backup procedures for data of a host environment that is separate from the first backup system 410-a, a request to generate the configuration backup for the first backup system 410-a. In some examples, the request is transmitted based at least in part on the configuration information (e.g., the backup schedule). Transmitting the request may include transmitting an API request to the first backup system 410-a.

At 425, the first backup system 410-a may generate the configuration backup based at least in part on receiving the request. The configuration backup may include configuration information for the one or more backup procedures managed by the first backup system. The configuration information may include backup retention periods, backup schedules, security information, credentials, host environment information, or the like.

At 430, the data management system 405 may cause the configuration backup for the first backup system 410-a to be stored in the separate storage location 470 (e.g., by causing the first backup system 410-a to send the configuration backup to the separate storage location 470). In some examples, the configuration backup is stored in the separate storage location 470 based at least in part on the request at 420. More particularly, the request may include an indication of the separate storage location 470. In some examples, the configuration backup is stored in a third backup system that manages backup procedures for data of a second host environment. Additionally, or alternatively, the configuration backup is stored in a cloud storage environment. In some examples, the data management system 405 may cause (e.g., based on the request at 420), the configuration backup to be encrypted using an encryption key and cause the encrypted configuration backup to be stored at the separate storage location 470.

At 435, the data management system 405 may detect failure of the first backup system 410-a. The failure may be detected based on the first backup system 410-a being offline, based on an error report received from the first backup system 410-a, or the like.

At 440, the data management system 405 may transmit, based on detecting the failure, a restore request to the second backup system 410-*b*. The request may indicate that the second backup system 410-*b* is to restore the configuration backup generated by the first data management system.

At 445, the second backup system 410-*b* may download the configuration backup generated by the first backup system 410-*a* from the separate storage location 445. In some examples, downloading the backup includes transmitting a request to the separate storage location 470 where the configuration backup is stored.

At 450, the data management system 405 may receive, via a user interface, selection of the one or more configurations of the first backup system (e.g., from the downloaded configuration backup). In some examples, the data management system 405 may receive, via the user interface, an input indicating that one or more additional configurations indicated by the configuration information of the configuration backup are to not to be applied during a configuration backup recovery. The user interface may display the configurations for selection to include or not include in the backup recovery.

At 455, the data management system 405 may transmit, to the second backup system 410-*b*, a request to apply one or more configurations of the first backup system to the second backup system based at least in part on the stored configuration backup for the first backup system. The request may be an example of an API request. In some examples, the request to apply the one or more configurations is transmitted based at least in part on receiving the selection of the one or more configurations. In some examples, the one or more additional configurations are associated with customer security information, and the request may indicate that the second backup system 410-*b* is not to apply the additional configurations. The customer security information may include usernames, passwords, cryptographic keys, or any combination thereof.

At 460, the second backup system 410-*b* may restore the configurations based at least in part on receiving the request. Restoring the configurations may include executing one or more restore procedures.

Figure 5:
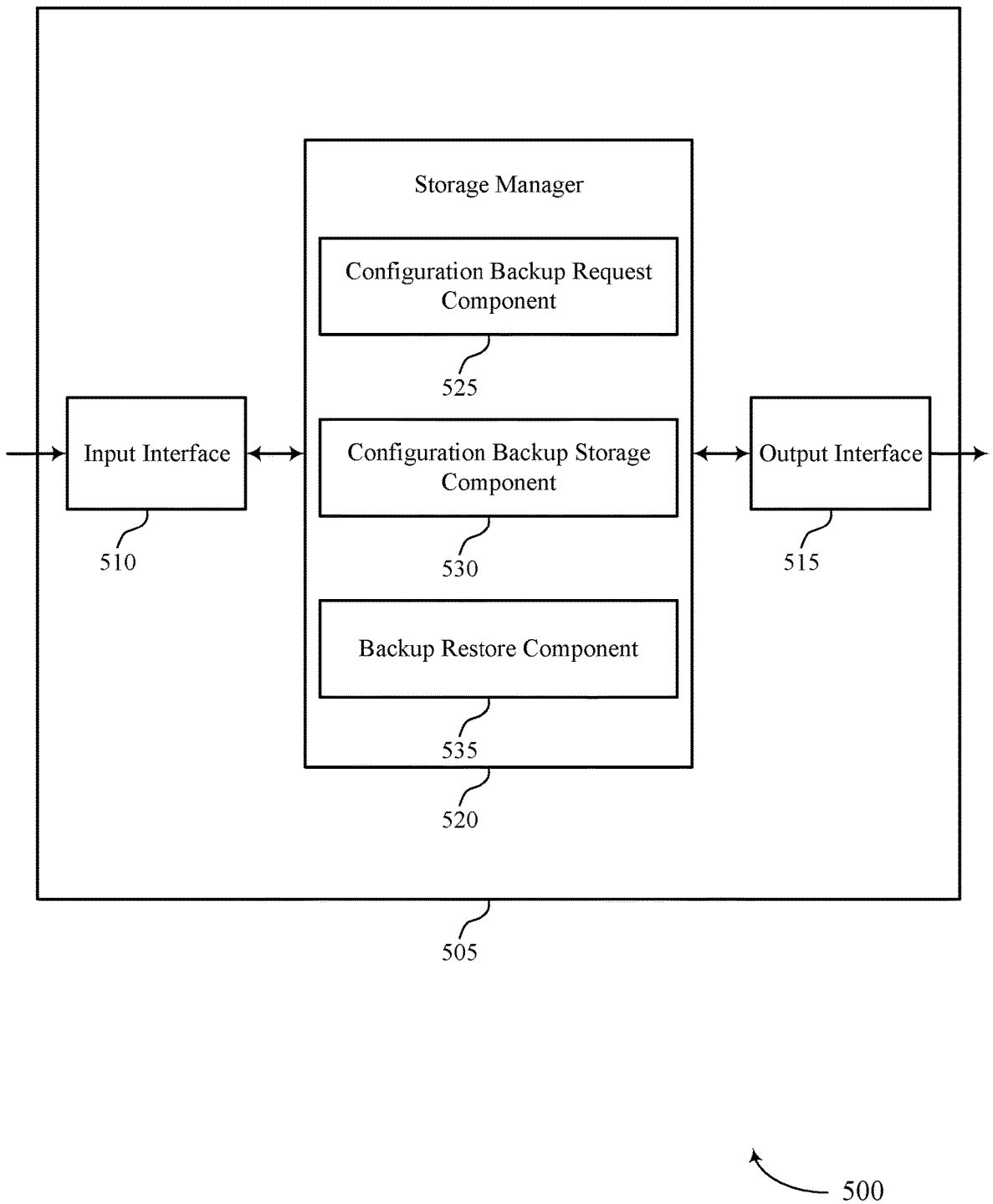
FIG. 5 shows a block diagram of an apparatus that supports configuration recovery for a data management system in accordance with aspects of the present disclosure.

FIG. 5 shows a block diagram 500 of a system 505 that supports configuration recovery for a data management system in accordance with aspects of the present disclosure. In some examples, the system 505 may be an example of aspects of one or more components described with reference to FIG. 1, such as a DMS 110. The system 505 may include an input interface 510, an output interface 515, and a storage manager 520. The system 505 may also include one or more processors. Each of these components may be in communication with one another (e.g., via one or more buses, communications links, communications interfaces, or any combination thereof).

The input interface 510 may manage input signals for the system 505. For example, the input interface 510 may receive input signaling (e.g., messages, packets, data, instructions, commands, or any other form of encoded information) from other systems or devices. The input interface 510 may send signaling correspond to (e.g., representative of or otherwise based on) such input signaling to other components of the system 505 for processing. For example, the input interface 510 may transmit such corresponding signaling to the storage manager 520 to support configuration recovery for a data management system. In some cases, the input interface 510 may be a component of a network interface 710 as described with reference to FIG. 7.

The output interface 515 may manage output signaling for the system 505. For example, the output interface 515 may receive signaling from other components of the system 505, such as the storage manager 520, such output signaling corresponding to (e.g., representative of or otherwise based on) such signaling to other systems or devices. In some cases, the output interface 515 may be a component of a network interface 710 as described with reference to FIG. 7.

For example, the storage manager 520 may include a configuration backup request component 525, a configuration backup storage component 530, a backup restore component 535, or any combination thereof. In some examples, the storage manager 520, or various components thereof, may be configured to perform various operations (e.g., receiving, monitoring, transmitting) using or otherwise in cooperation with the input interface 510, the output interface 515, or both. For example, the storage manager 520 may receive information from the input interface 510, send information to the output interface 515, or be integrated in combination with the input interface 510, the output interface 515, or both to receive information, transmit information, or perform various other operations as described herein.

The configuration backup request component 525 may be configured as or otherwise support a means for transmitting, from a data management system to a first backup system that manages one or more backup procedures for data of a host environment that is separate from the first backup system, a request to generate a configuration backup for the first backup system, the configuration backup including configuration information for the one or more backup procedures managed by the first backup system. The configuration backup storage component 530 may be configured as or otherwise support a means for causing, by the data management system, the configuration backup for the first backup system to be stored in a separate location from the first backup system. The backup restore component 535 may be configured as or otherwise support a means for transmitting, from the data management system to a second backup system, a request to apply one or more configurations of the first backup system to the second backup system based on the stored configuration backup for the first backup system.

Figure 6:
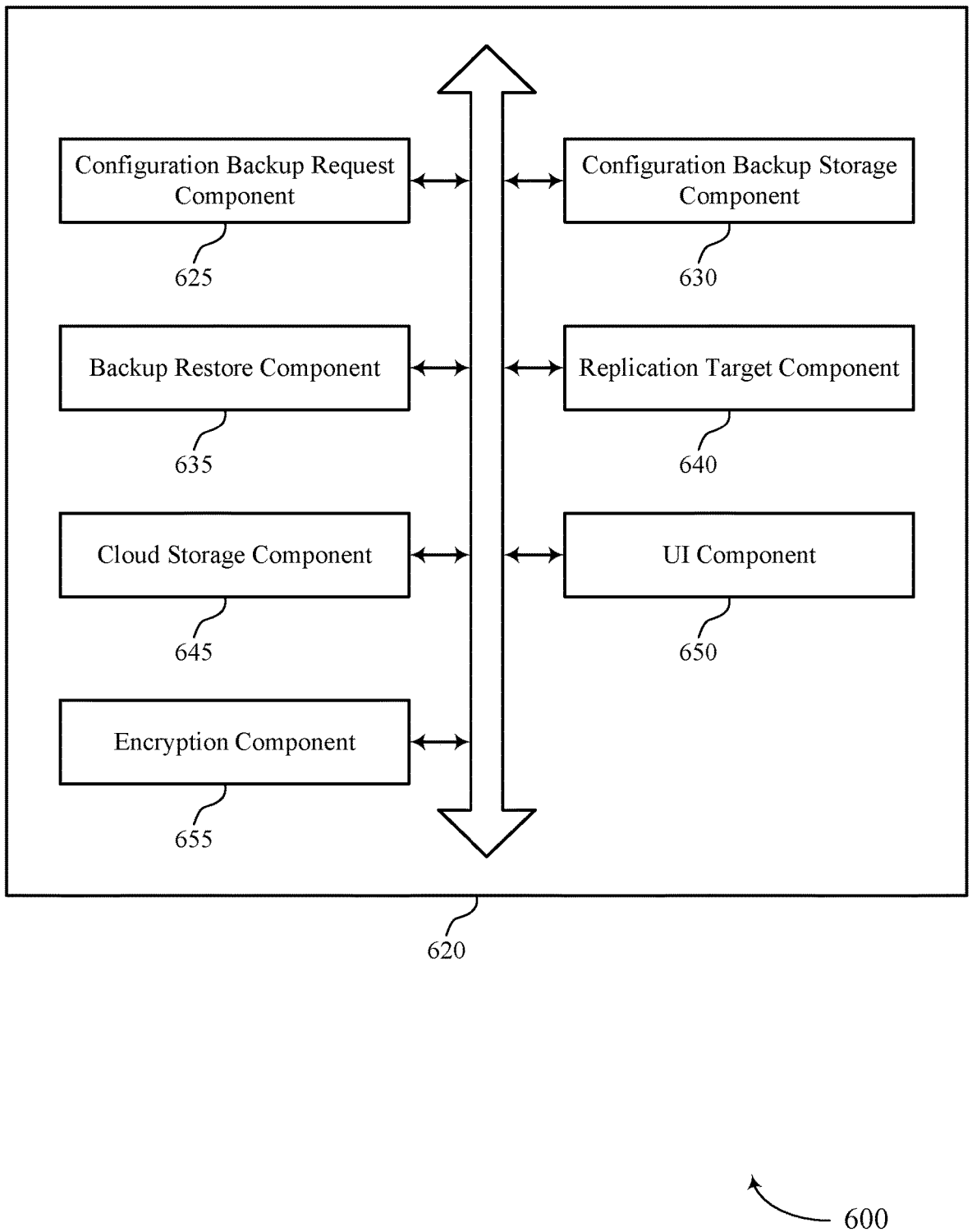
FIG. 6 shows a block diagram of a storage manager that supports configuration recovery for a data management system in accordance with aspects of the present disclosure.

FIG. 6 shows a block diagram 600 of a storage manager 620 that supports configuration recovery for a data management system in accordance with aspects of the present disclosure. The storage manager 620 may be an example of aspects of or include aspects of a storage manager or a storage manager 520 as described herein. The storage manager 620, or various components thereof, may be an example of means for performing various aspects of configuration recovery for a data management system as described herein. For example, the storage manager 620 may include a configuration backup request component 625, a configuration backup storage component 630, a backup restore component 635, a replication target component 640, a cloud storage component 645, a UI component 650, an encryption component 655, or any combination thereof. Each of these components may communicate, directly or indirectly, with one another (e.g., via one or more buses, communications links, communications interfaces, or any combination thereof).

The configuration backup request component 625 may be configured as or otherwise support a means for transmitting, from a data management system to a first backup system that manages one or more backup procedures for data of a host environment that is separate from the first backup system, a request to generate a configuration backup for the first backup system, the configuration backup including configuration information for the one or more backup procedures managed by the first backup system. The configuration backup storage component 630 may be configured as or otherwise support a means for causing, by the data management system, the configuration backup for the first backup system to be stored in a separate location from the first backup system. The backup restore component 635 may be configured as or otherwise support a means for transmitting, from the data management system to a second backup system, a request to apply one or more configurations of the first backup system to the second backup system based on the stored configuration backup for the first backup system.

In some examples, to support causing the configuration backup to be stored in the separate location, the replication target component 640 may be configured as or otherwise support a means for causing the configuration backup to be stored in a third backup system that manages one or more backup procedures for data of a second host environment.

In some examples, to support causing the configuration backup to be stored in the separate location, the cloud storage component 645 may be configured as or otherwise support a means for causing the configuration backup to be stored in a cloud storage environment.

In some examples, the UI component 650 may be configured as or otherwise support a means for receiving, via a user interface of the data management system, an indication of a backup schedule, a backup retention period, or both for the configuration backup for the data of the host environment.

In some examples, the UI component 650 may be configured as or otherwise support a means for receiving, via a user interface of the data management system, a selection of the one or more configurations of the first backup system, where the request to apply the one or more configurations is transmitted based on receiving the selection of the one or more configurations.

In some examples, the one or more configurations are associated with a subset of the configuration information included in the configuration backup.

In some examples, to support causing the configuration backup to be stored in the separate location, the encryption component 655 may be configured as or otherwise support a means for causing the configuration backup to be encrypted using an encryption key. In some examples, to support causing the configuration backup to be stored in the separate location, the encryption component 655 may be configured as or otherwise support a means for causing the encrypted configuration backup to be stored in the separate location.

In some examples, the UI component 650 may be configured as or otherwise support a means for receiving, via a user interface of the data management system, an indication of the encryption key to use for encrypting the configuration backup, where the configuration backup is encrypted using the encryption key based on receiving the indication of the encryption key.

In some examples, the UI component 650 may be configured as or otherwise support a means for receiving, via a user interface of the data management system, an input indicating that one or more additional configurations indicated by the configuration information of the configuration backup are to not to be applied during a configuration backup recovery, where the one or more additional configurations are associated with customer security information.

In some examples, to support transmitting the request to apply the one or more configurations of the first backup system to the second backup system, the backup restore component 635 may be configured as or otherwise support a means for transmitting the request to refrain from applying the one or more additional configurations of the first backup system to the second backup system.

In some examples, the customer security information includes usernames, passwords, cryptographic keys, or any combination thereof.

Figure 7:
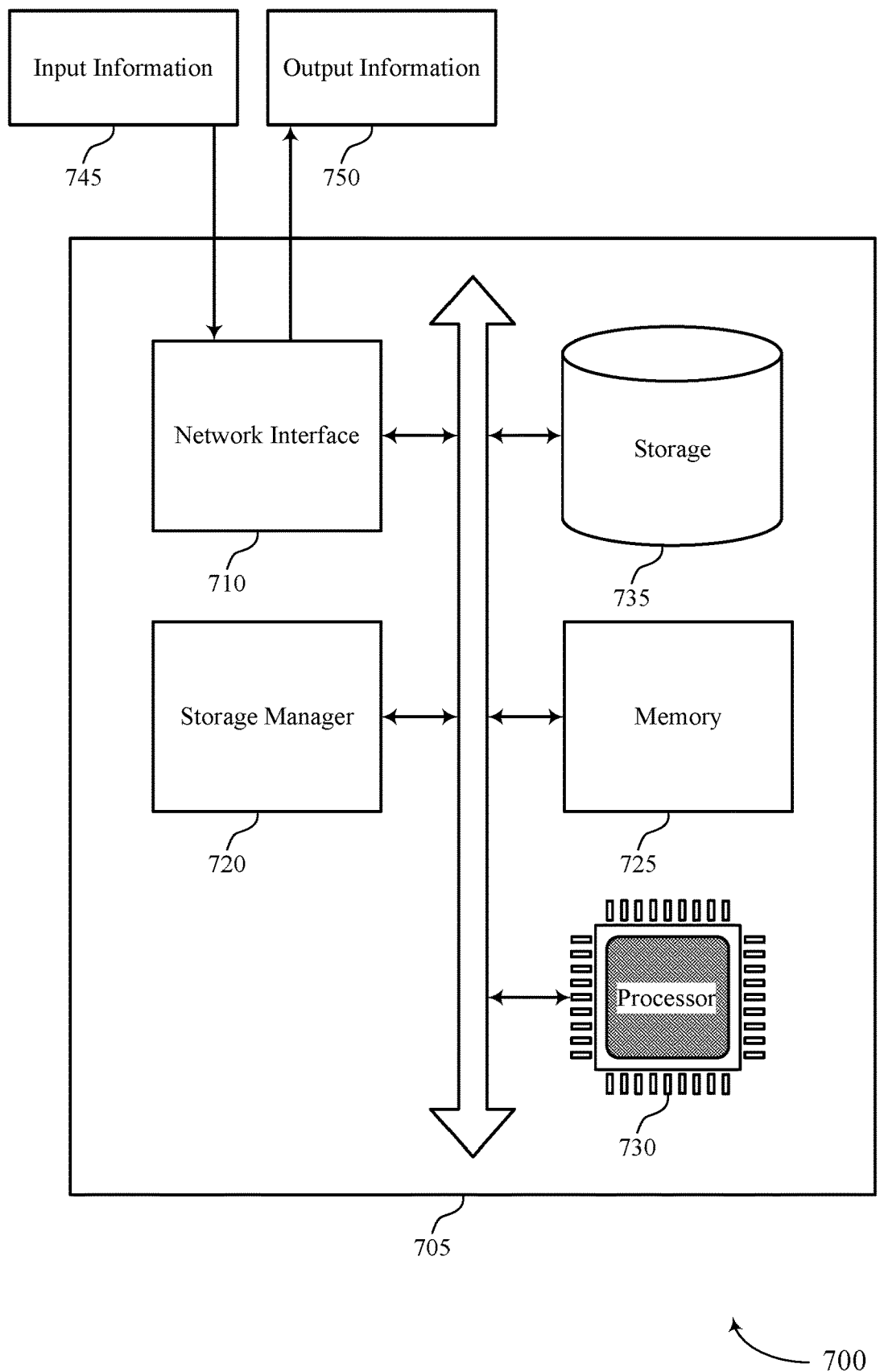
FIG. 7 shows a diagram of a system including a device that supports configuration recovery for a data management system in accordance with aspects of the present disclosure.

FIG. 7 shows a block diagram 700 of a system 705 that supports configuration recovery for a data management system in accordance with aspects of the present disclosure. The system 705 may be an example of or include aspects of a system 505 as described herein. The system 705 may include components for data management, including components such as a storage manager 720, an network interface 710, a memory 725, a processor 730, and a storage 735. These components may be in electronic communication or otherwise coupled with each other (e.g., operatively, communicatively, functionally, electronically, electrically; via one or more buses, communications links, communications interfaces, or any combination thereof). Additionally, the components of the system 705 may comprise corresponding physical components or may be implemented as corresponding virtual components (e.g., components of one or more virtual machines). In some examples, the system 705 may be an example of aspects of one or more components described with reference to FIG. 1, such as a DMS 110.

The network interface 710 may enable the system 705 to exchange information (e.g., input information 745, output information 750, or both) with other systems or devices (not shown). For example, the network interface 710 may enable the system 705 to connect to a network (e.g., a network 120 as described herein). The network interface 710 may include one or more wireless network interfaces, one or more wired network interfaces, or any combination thereof. In some examples, the network interface 710 may be an example of may be an example of aspects of one or more components described with reference to FIG. 1, such as one or more network interfaces 165.

Memory 725 may include RAM, ROM, or both. The memory 725 may store computer-readable, computer-executable software including instructions that, when executed, cause the processor 730 to perform various functions described herein. In some cases, the memory 725 may contain, among other things, a BIOS which may control basic hardware or software operation such as the interaction with peripheral components or devices. In some cases, the memory 725 may be an example of aspects of one or more components described with reference to FIG. 1, such as one or more memories 175.

The processor 730 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 730 may be configured to execute computer-readable instructions stored in a memory 725 to perform various functions (e.g., functions or tasks supporting configuration recovery for a data management system). Though a single processor 730 is depicted in the example of FIG. 7, it is to be understood that the system 705 may include any quantity of one or more of processors 730 and that a group of processors 730 may collectively perform one or more functions ascribed herein to a processor, such as the processor 730. In some cases, the processor 730 may be an example of aspects of one or more components described with reference to FIG. 1, such as one or more processors 170.

Storage 735 may be configured to store data that is generated, processed, stored, or otherwise used by the system 705. In some cases, the storage 735 may include one or more HDDs, one or more SDDs, or both. In some examples, the storage 735 may be an example of a single database, a distributed database, multiple distributed databases, a data store, a data lake, or an emergency backup database. In some examples, the storage 735 may be an example of one or more components described with reference to FIG. 1, such as one or more network disks 180.

For example, the storage manager 720 may be configured as or otherwise support a means for transmitting a replication target component 640 as described with reference to FIG. 6 from a data management system to a first backup system that manages one or more backup procedures for data of a host environment that is separate from the first backup system, a request to generate a configuration backup for the first backup system, the configuration backup including configuration information for the one or more backup procedures managed by the first backup system. The storage manager 720 may be configured as or otherwise support a means for causing, by the data management system, the configuration backup for the first backup system to be stored in a separate location from the first backup system. The storage manager 720 may be configured as or otherwise support a means for transmitting, from the data management system to a second backup system, a request to apply one or more configurations of the first backup system to the second backup system based on the stored configuration backup for the first backup system.

By including or configuring the storage manager 720 in accordance with examples as described herein, the system 705 may support techniques for improved data security and improved user experience by supporting configuration backups of a backup system.

Figure 8:
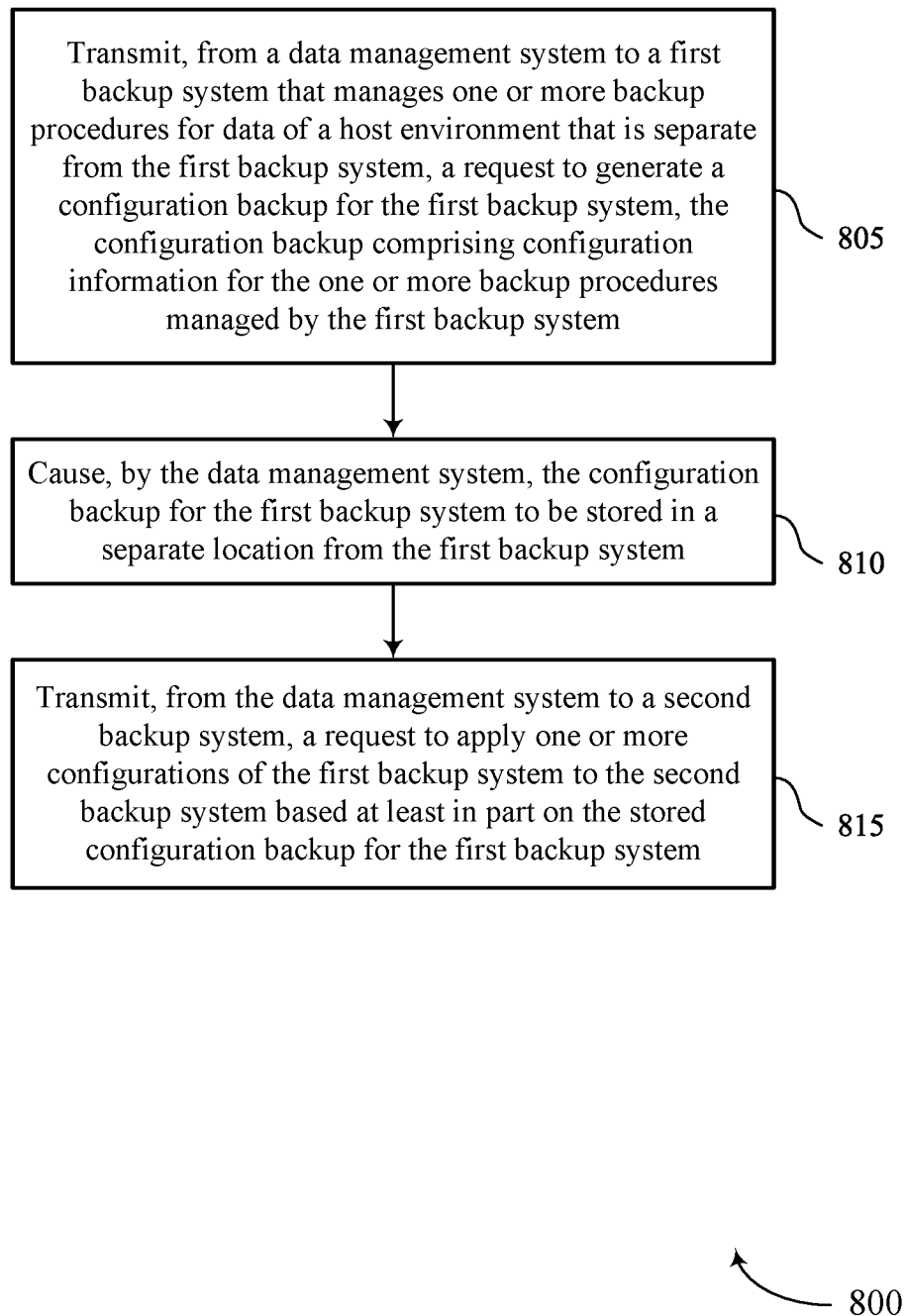
FIGS. 8 through 11 show flowcharts illustrating methods that support configuration recovery for a data management system in accordance with aspects of the present disclosure.

FIG. 8 shows a flowchart illustrating a method 800 that supports configuration recovery for a data management system in accordance with aspects of the present disclosure. The operations of the method 800 may be implemented by a system or its components as described herein. For example, the operations of the method 800 may be performed by a may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include transmitting, from a data management system to a first backup system that manages one or more backup procedures for data of a host environment that is separate from the first backup system, a request to generate a configuration backup for the first backup system, the configuration backup including configuration information for the one or more backup procedures managed by the first backup system. The operations of 805 may be performed in accordance with examples as disclosed herein. In some examples, aspects of the operations of 805 may be performed by a configuration backup request component 625 as described with reference to FIG. 6.

At 810, the method may include causing, by the data management system, the configuration backup for the first backup system to be stored in a separate location from the first backup system. The operations of 810 may be performed in accordance with examples as disclosed herein. In some examples, aspects of the operations of 810 may be performed by a configuration backup storage component 630 as described with reference to FIG. 6.

At 815, the method may include transmitting, from the data management system to a second backup system, a request to apply one or more configurations of the first backup system to the second backup system based on the stored configuration backup for the first backup system. The operations of 815 may be performed in accordance with examples as disclosed herein. In some examples, aspects of the operations of 815 may be performed by a backup restore component 635 as described with reference to FIG. 6.

Figure 9:
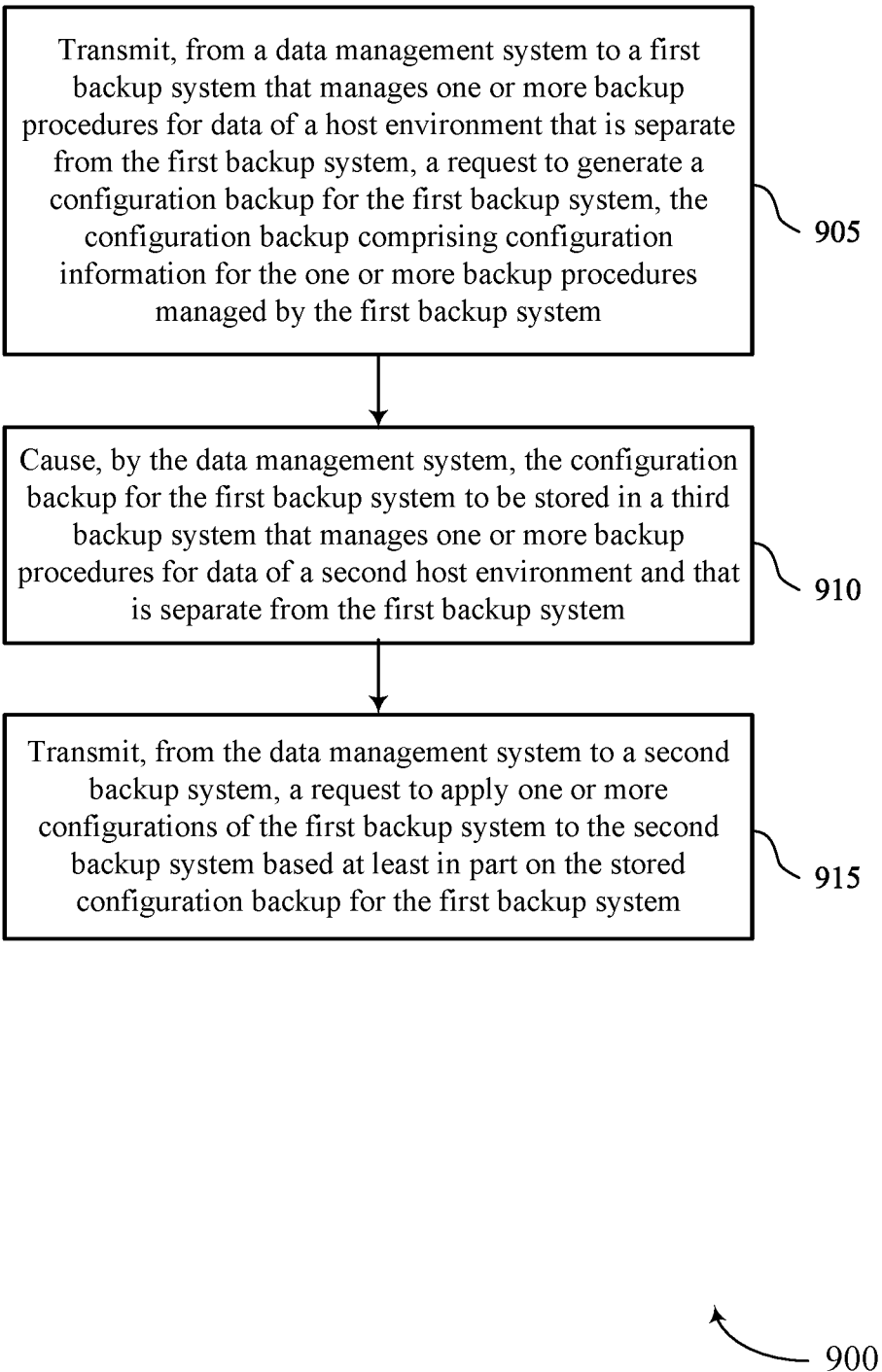

FIG. 9 shows a flowchart illustrating a method 900 that supports configuration recovery for a data management system in accordance with aspects of the present disclosure. The operations of the method 900 may be implemented by a system or its components as described herein. For example, the operations of the method 900 may be performed by a may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include transmitting, from a data management system to a first backup system that manages one or more backup procedures for data of a host environment that is separate from the first backup system, a request to generate a configuration backup for the first backup system, the configuration backup including configuration information for the one or more backup procedures managed by the first backup system. The operations of 905 may be performed in accordance with examples as disclosed herein. In some examples, aspects of the operations of 905 may be performed by a configuration backup request component 625 as described with reference to FIG. 6.

At 910, the method may include causing, by the data management system, the configuration backup for the first backup system to be stored in a third backup system that manages one or more backup procedures for data of a second host environment and that is separate from the first backup system. The operations of 910 may be performed in accordance with examples as disclosed herein. In some examples, aspects of the operations of 910 may be performed by a replication target component 640 as described with reference to FIG. 6.

At 915, the method may include transmitting, from the data management system to a second backup system, a request to apply one or more configurations of the first backup system to the second backup system based on the stored configuration backup for the first backup system. The operations of 920 may be performed in accordance with examples as disclosed herein. In some examples, aspects of the operations of 920 may be performed by a backup restore component 635 as described with reference to FIG. 6.

Figure 10:
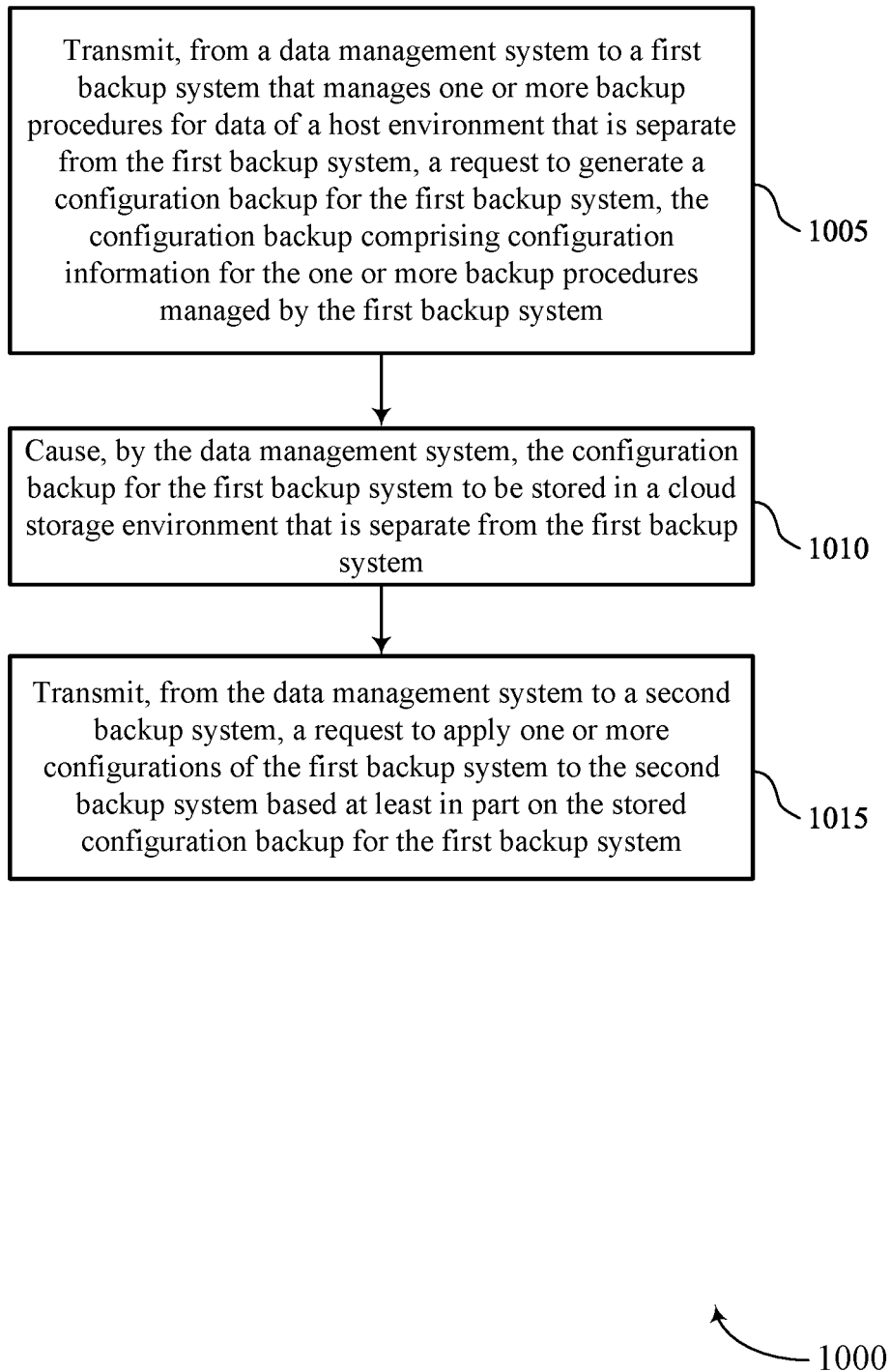

FIG. 10 shows a flowchart illustrating a method 1000 that supports configuration recovery for a data management system in accordance with aspects of the present disclosure. The operations of the method 1000 may be implemented by a system or its components as described herein. For example, the operations of the method 1000 may be performed by a may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1005, the method may include transmitting, from a data management system to a first backup system that manages one or more backup procedures for data of a host environment that is separate from the first backup system, a request to generate a configuration backup for the first backup system, the configuration backup including configuration information for the one or more backup procedures managed by the first backup system. The operations of 1005 may be performed in accordance with examples as disclosed herein. In some examples, aspects of the operations of 1005 may be performed by a configuration backup request component 625 as described with reference to FIG. 6.

At 1010, the method may include causing, by the data management system, the configuration backup for the first backup system to be stored in a cloud storage environment that is separate from the first backup system. The operations of 1010 may be performed in accordance with examples as disclosed herein. In some examples, aspects of the operations of 1010 may be performed by a cloud storage component 645 as described with reference to FIG. 6.

At 1015, the method may include transmitting, from the data management system to a second backup system, a request to apply one or more configurations of the first backup system to the second backup system based on the stored configuration backup for the first backup system. The operations of 1020 may be performed in accordance with examples as disclosed herein. In some examples, aspects of the operations of 1020 may be performed by a backup restore component 635 as described with reference to FIG. 6.

Figure 11:
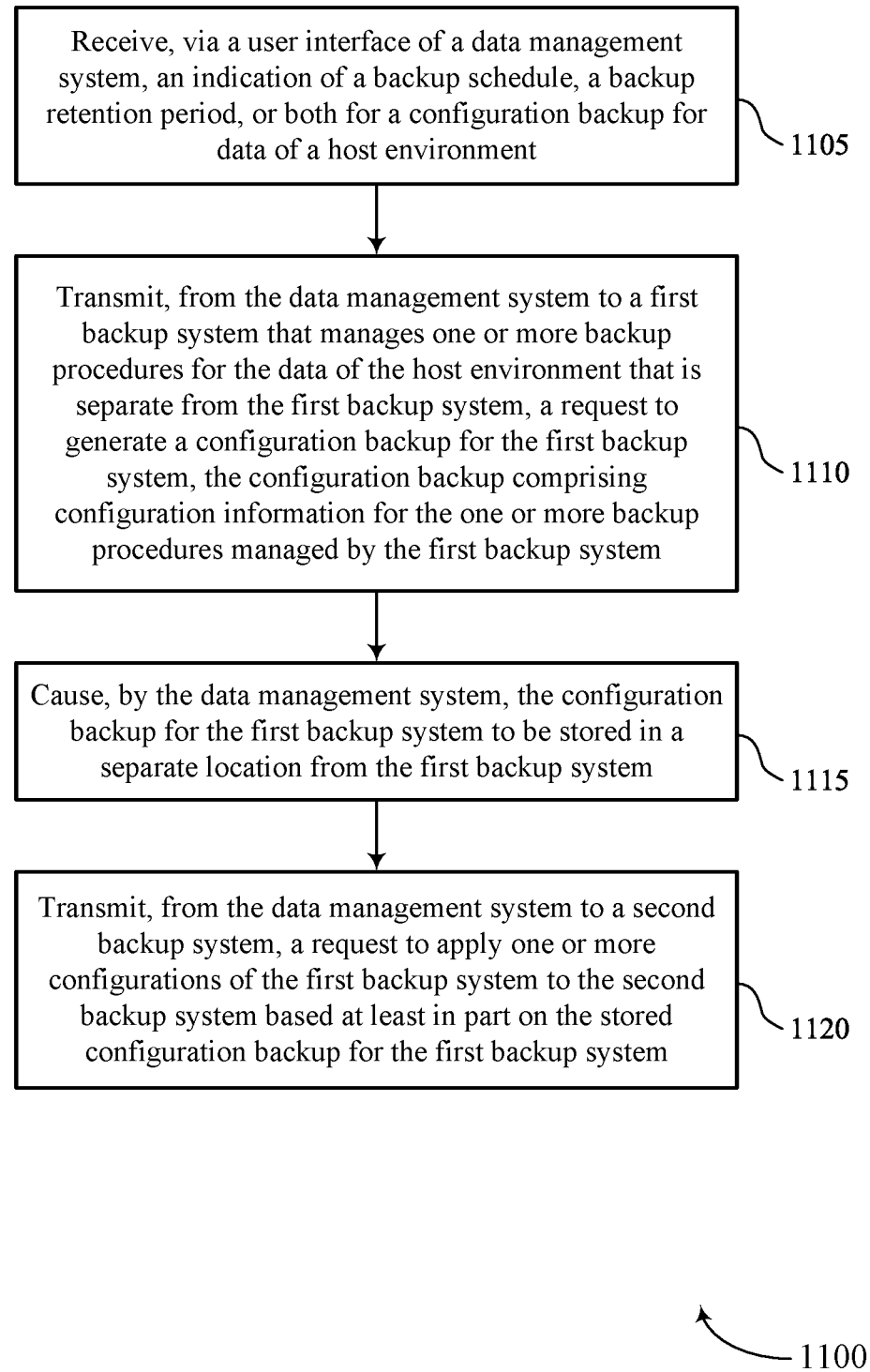

FIG. 11 shows a flowchart illustrating a method 1100 that supports configuration recovery for a data management system in accordance with aspects of the present disclosure. The operations of the method 1100 may be implemented by a system or its components as described herein. For example, the operations of the method 1100 may be performed by a may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1105, the method may include receiving, via a user interface of the data management system, an indication of a backup schedule, a backup retention period, or both for a configuration backup for data of a host environment. The operations of 1105 may be performed in accordance with examples as disclosed herein. In some examples, aspects of the operations of 1105 may be performed by a UI component 650 as described with reference to FIG. 6.

At 1110, the method may include transmitting, from the data management system to a first backup system that manages one or more backup procedures for the data of the host environment that is separate from the first backup system, a request to generate a configuration backup for the first backup system, the configuration backup including configuration information for the one or more backup procedures managed by the first backup system. The operations of 1110 may be performed in accordance with examples as disclosed herein. In some examples, aspects of the operations of 1110 may be performed by a configuration backup request component 625 as described with reference to FIG. 6.

At 1115, the method may include causing, by the data management system, the configuration backup for the first backup system to be stored in a separate location from the first backup system. The operations of 1115 may be performed in accordance with examples as disclosed herein. In some examples, aspects of the operations of 1115 may be performed by a configuration backup storage component 630 as described with reference to FIG. 6.

At 1120, the method may include transmitting, from the data management system to a second backup system, a request to apply one or more configurations of the first backup system to the second backup system based on the stored configuration backup for the first backup system. The operations of 1120 may be performed in accordance with examples as disclosed herein. In some examples, aspects of the operations of 1120 may be performed by a backup restore component 635 as described with reference to FIG. 6.

A method is described. The method may include transmitting, from a data management system to a first backup system that manages one or more backup procedures for data of a host environment that is separate from the first backup system, a request to generate a configuration backup for the first backup system, the configuration backup including configuration information for the one or more backup procedures managed by the first backup system, causing, by the data management system, the configuration backup for the first backup system to be stored in a separate location from the first backup system, and transmitting, from the data management system to a second backup system, a request to apply one or more configurations of the first backup system to the second backup system based on the stored configuration backup for the first backup system.

An apparatus is described. The apparatus may include a processor, memory coupled with the processor, and instructions stored in the memory. The instructions may be executable by the processor to cause the apparatus to transmit, from a data management system to a first backup system that manages one or more backup procedures for data of a host environment that is separate from the first backup system, a request to generate a configuration backup for the first backup system, the configuration backup including configuration information for the one or more backup procedures managed by the first backup system, cause, by the data management system, the configuration backup for the first backup system to be stored in a separate location from the first backup system, and transmit, from the data management system to a second backup system, a request to apply one or more configurations of the first backup system to the second backup system based on the stored configuration backup for the first backup system.

Another apparatus is described. The apparatus may include means for transmitting, from a data management system to a first backup system that manages one or more backup procedures for data of a host environment that is separate from the first backup system, a request to generate a configuration backup for the first backup system, the configuration backup including configuration information for the one or more backup procedures managed by the first backup system, means for causing, by the data management system, the configuration backup for the first backup system to be stored in a separate location from the first backup system, and means for transmitting, from the data management system to a second backup system, a request to apply one or more configurations of the first backup system to the second backup system based on the stored configuration backup for the first backup system.

A non-transitory computer-readable medium storing code is described. The code may include instructions executable by a processor to transmit, from a data management system to a first backup system that manages one or more backup procedures for data of a host environment that is separate from the first backup system, a request to generate a configuration backup for the first backup system, the configuration backup including configuration information for the one or more backup procedures managed by the first backup system, cause, by the data management system, the configuration backup for the first backup system to be stored in a separate location from the first backup system, and transmit, from the data management system to a second backup system, a request to apply one or more configurations of the first backup system to the second backup system based on the stored configuration backup for the first backup system.

In some examples of the method, apparatuses, and non-transitory computer-readable medium described herein, operations, features, means, or instructions for causing the configuration backup to be stored in the separate location may include operations, features, means, or instructions for causing the configuration backup to be stored in a third backup system that manages one or more backup procedures for data of a second host environment.

In some examples of the method, apparatuses, and non-transitory computer-readable medium described herein, operations, features, means, or instructions for causing the configuration backup to be stored in the separate location may include operations, features, means, or instructions for causing the configuration backup to be stored in a cloud storage environment.

Some examples of the method, apparatuses, and non-transitory computer-readable medium described herein may further include operations, features, means, or instructions for receiving, via a user interface of the data management system, an indication of a backup schedule, a backup retention period, or both for the configuration backup for the data of the host environment.

Some examples of the method, apparatuses, and non-transitory computer-readable medium described herein may further include operations, features, means, or instructions for receiving, via a user interface of the data management system, a selection of the one or more configurations of the first backup system, where the request to apply the one or more configurations may be transmitted based on receiving the selection of the one or more configurations.

In some examples of the method, apparatuses, and non-transitory computer-readable medium described herein, the one or more configurations may be associated with a subset of the configuration information included in the configuration backup.

In some examples of the method, apparatuses, and non-transitory computer-readable medium described herein, operations, features, means, or instructions for causing the configuration backup to be stored in the separate location may include operations, features, means, or instructions for causing the configuration backup to be encrypted using an encryption key and causing the encrypted configuration backup to be stored in the separate location.

Some examples of the method, apparatuses, and non-transitory computer-readable medium described herein may further include operations, features, means, or instructions for receiving, via a user interface of the data management system, an indication of the encryption key to use for encrypting the configuration backup, where the configuration backup may be encrypted using the encryption key based on receiving the indication of the encryption key.

Some examples of the method, apparatuses, and non-transitory computer-readable medium described herein may further include operations, features, means, or instructions for receiving, via a user interface of the data management system, an input indicating that one or more additional configurations indicated by the configuration information of the configuration backup may be to not to be applied during a configuration backup recovery, where the one or more additional configurations may be associated with customer security information.

In some examples of the method, apparatuses, and non-transitory computer-readable medium described herein, operations, features, means, or instructions for transmitting the request to apply the one or more configurations of the first backup system to the second backup system may include operations, features, means, or instructions for transmitting the request to refrain from applying the one or more additional configurations of the first backup system to the second backup system.

In some examples of the method, apparatuses, and non-transitory computer-readable medium described herein, the customer security information includes usernames, passwords, cryptographic keys, or any combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes non-transitory computer storage media. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data management comprising:
   transmitting, from a data management system to a first backup system that manages one or more backup procedures for data of a host environment that is separate from the first backup system, a request to generate a configuration backup for the first backup system, the configuration backup comprising configuration information that indicates one or more backup parameters for obtaining one or more snapshots of the data as part of the one or more backup procedures managed by the first backup system;
   causing, by the data management system, the configuration backup for the first backup system to be stored in a separate location from the first backup system; and
   transmitting, from the data management system to a second backup system, a request to apply one or more configurations of the first backup system to the second backup system based at least in part on the stored configuration backup for the first backup system, wherein the one or more configurations of the first backup system, once applied to the second backup system, support management, by the second backup system, of one or more subsequent backup procedures including obtaining one or more subsequent snapshots of the data of the host environment in accordance with the one or more backup parameters.

2. The method of claim 1, wherein causing the configuration backup to be stored in the separate location comprises:
   causing the configuration backup to be stored in a third backup system that manages one or more second backup procedures for second data of a second host environment.

3. The method of claim 1, wherein causing the configuration backup to be stored in the separate location comprises:
   causing the configuration backup to be stored in a cloud storage environment.

4. The method of claim 1, further comprising:
   receiving, via a user interface of the data management system, an indication of a backup schedule, a backup retention period, or both for the configuration backup for the data of the host environment.

5. The method of claim 1, further comprising:
   receiving, via a user interface of the data management system, a selection of the one or more configurations of the first backup system, wherein the request to apply the one or more configurations is transmitted based at least in part on receiving the selection of the one or more configurations.

6. The method of claim 5, wherein the one or more configurations are associated with a subset of the configuration information included in the configuration backup.

7. The method of claim 1, wherein causing the configuration backup to be stored in the separate location comprises:
   causing the configuration backup to be encrypted using an encryption key; and
   causing the encrypted configuration backup to be stored in the separate location.

8. The method of claim 7, further comprising:
   receiving, via a user interface of the data management system, an indication of the encryption key to use for encrypting the configuration backup, wherein the configuration backup is encrypted using the encryption key based at least in part on receiving the indication of the encryption key.

9. The method of claim 1, wherein the one or more configurations indicated via the request are a subset of a plurality of configurations indicated by the configuration information of the configuration backup.

10. The method of claim 9, wherein transmitting the request to apply the one or more configurations of the first backup system to the second backup system comprises:
    transmitting the request to apply the one or more configurations of the first backup system to the second backup system and to refrain from applying other configurations of the plurality of configurations that are different than the one or more configurations of the first backup system to the second backup system.

11. The method of claim 9, wherein the plurality of configurations indicated by the configuration information comprises the one or more configurations and one or more second configurations associated with customer security information, the customer security information comprising usernames, passwords, cryptographic keys, or any combination thereof.

12. An apparatus, comprising:
one or more memories storing processor-executable code; and
one or more processors coupled with the one or more memories and individually or collectively operable to execute the code to cause the apparatus to:
transmit, from a data management system to a first backup system that manages one or more backup procedures for data of a host environment that is separate from the first backup system, a request to generate a configuration backup for the first backup system, the configuration backup comprising configuration information that indicates one or more backup parameters for obtaining one or more snapshots of the data as part of the one or more backup procedures managed by the first backup system;
cause, by the data management system, the configuration backup for the first backup system to be stored in a separate location from the first backup system; and
transmit, from the data management system to a second backup system, a request to apply one or more configurations of the first backup system to the second backup system based at least in part on the stored configuration backup for the first backup system, wherein the one or more configurations of the first backup system, once applied to the second backup system, support management, by the second backup system, of one or more subsequent backup procedures including obtaining one or more subsequent snapshots of the data of the host environment in accordance with the one or more backup parameters.

13. The apparatus of claim 12, wherein, to cause the configuration backup to be stored in the separate location, the one or more processors are individually or collectively operable to execute the code to cause the apparatus to:
cause the configuration backup to be stored in a third backup system that manages one or more backup procedures for data of a second host environment.

14. The apparatus of claim 12, wherein, to cause the configuration backup to be stored in the separate location, the one or more processors are individually or collectively operable to execute the code cause the apparatus to:
cause the configuration backup to be stored in a cloud storage environment.

15. The apparatus of claim 12, wherein the one or more processors are individually or collectively further operable to execute the code to cause the apparatus to:
receive, via a user interface of the data management system, an indication of a backup schedule, a backup retention period, or both for the configuration backup for the data of the host environment.

16. The apparatus of claim 12, wherein the one or more processors are individually or collectively further operable to execute the code to cause the apparatus to:
receive, via a user interface of the data management system, a selection of the one or more configurations of the first backup system, wherein the request to apply the one or more configurations is transmitted based at least in part on receiving the selection of the one or more configurations.

17. A non-transitory computer-readable medium storing code, the code comprising instructions executable by one or more processors to:
transmit, from a data management system to a first backup system that manages one or more backup procedures for data of a host environment that is separate from the first backup system, a request to generate a configuration backup for the first backup system, the configuration backup comprising configuration information that indicates one or more backup parameters for obtaining one or more snapshots of the data as part of the one or more backup procedures managed by the first backup system;
cause, by the data management system, the configuration backup for the first backup system to be stored in a separate location from the first backup system; and
transmit, from the data management system to a second backup system, a request to apply one or more configurations of the first backup system to the second backup system based at least in part on the stored configuration backup for the first backup system, wherein the one or more configurations of the first backup system, once applied to the second backup system, support management, by the second backup system, of one or more subsequent backup procedures including obtaining one or more subsequent snapshots of the data of the host environment in accordance with the one or more backup parameters.

18. The non-transitory computer-readable medium of claim 17, wherein, to cause the configuration backup to be stored in the separate location, the instructions are executable by the one or more processors to:
cause the configuration backup to be stored in a third backup system that manages one or more backup procedures for data of a second host environment.

19. The non-transitory computer-readable medium of claim 17, wherein, to cause the configuration backup to be stored in the separate location, the instructions are executable by the one or more processors to:
cause the configuration backup to be stored in a cloud storage environment.

20. The non-transitory computer-readable medium of claim 17, wherein the instructions are further executable by the one or more processors to:
receive, via a user interface of the data management system, an indication of a backup schedule, a backup retention period, or both for the configuration backup for the data of the host environment.

* * * * *